(12) United States Patent
Spandley et al.

(10) Patent No.: US 11,933,275 B2
(45) Date of Patent: Mar. 19, 2024

(54) WIND TURBINE BLADE WITH ELECTRO-THERMAL HEATING ELEMENT

(71) Applicant: VESTAS WIND SYSTEMS A/S, Aarhus N (DK)

(72) Inventors: Luke Spandley, Ventnor (GB); Paul Badger, Salisbury (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 94 days.

(21) Appl. No.: 17/633,518

(22) PCT Filed: Aug. 4, 2020

(86) PCT No.: PCT/DK2020/050226
§ 371 (c)(1),
(2) Date: Feb. 7, 2022

(87) PCT Pub. No.: WO2021/023355
PCT Pub. Date: Feb. 11, 2021

(65) Prior Publication Data
US 2022/0349389 A1 Nov. 3, 2022

(30) Foreign Application Priority Data
Aug. 5, 2019 (DK) .............. PA 2019 70498

(51) Int. Cl.
*F03D 80/60* (2016.01)
*F03D 1/06* (2006.01)
*F03D 80/40* (2016.01)

(52) U.S. Cl.
CPC ........... *F03D 80/60* (2016.05); *F03D 1/0675* (2013.01); *F03D 80/40* (2016.05); *F05B 2260/20* (2013.01)

(58) Field of Classification Search
CPC ........ F03D 80/60; F03D 1/0675; F03D 80/40; F05B 2260/20; F05B 2280/6003; Y02E 10/72
See application file for complete search history.

(56) References Cited

U.S. PATENT DOCUMENTS

| 10,294,925 B2 | 5/2019 | Klein |
| 10,787,267 B2 * | 9/2020 | Paulson ................. B64D 15/12 |

(Continued)

FOREIGN PATENT DOCUMENTS

| CA | 2933943 A1 | 12/2016 |
| CN | 108457816 A | 8/2018 |

(Continued)

OTHER PUBLICATIONS

Danish Patent and Trademark Office, 1st Technical Examination including the Search Report for Patent Application PA 2019 70498 dated Jan. 31, 2020.

(Continued)

*Primary Examiner* — Hoang M Nguyen
(74) *Attorney, Agent, or Firm* — Patterson + Sheridan, LLP

(57) ABSTRACT

A wind turbine blade comprising an electro-thermal heating element with a tapering width. The electro-thermal heating element comprises: electrically resistive sheet material; a first electrode which is in electrical contact with the sheet material and positioned at a first end of the element; and a second electrode which is in electrical contact with the sheet material and positioned at a second end of the sheet material. An electrically conductive strip extends across a width of the element. The sheet material has a first part on a first side of the strip and a second part on a second side of the strip. The strip is in electrical contact with the first and second parts of the sheet material. The first part of the sheet material has a (Continued)

first width, and the second part of the sheet material has a second width which is different to the first width.

20 Claims, 8 Drawing Sheets

(56) References Cited

U.S. PATENT DOCUMENTS

| | | | | |
|---|---|---|---|---|
| 2007/0210073 A1* | 9/2007 | Hubert | ................... | H05B 3/262 |
| | | | | 219/535 |
| 2011/0038729 A1* | 2/2011 | Shymanski | ............ | F03D 80/40 |
| | | | | 416/95 |
| 2013/0022466 A1 | 1/2013 | Laurberg | | |
| 2014/0363291 A1 | 12/2014 | Gaillardon et al. | | |
| 2015/0023792 A1* | 1/2015 | Spitzner | ................. | F03D 80/40 |
| | | | | 416/1 |
| 2016/0221680 A1* | 8/2016 | Burton | ................... | H05B 3/146 |
| 2017/0122295 A1 | 5/2017 | Klein | | |
| 2018/0288830 A1 | 10/2018 | Sajic | | |
| 2019/0145384 A1* | 5/2019 | Spandley | ................ | F03D 80/40 |
| | | | | 416/95 |

FOREIGN PATENT DOCUMENTS

| | | |
|---|---|---|
| CN | 109281807 A | 1/2019 |
| EP | 2843228 A1 | 3/2015 |
| TW | 201418573 A | 5/2014 |
| WO | 2021023355 A1 | 2/2021 |

OTHER PUBLICATIONS

PCT, International Search Report and Written Opinion of the International Searching Authority for Application PCT/DK2020/050226 dated Oct. 22, 2020.

* cited by examiner

WIND TURBINE BLADE WITH ELECTRO-THERMAL HEATING ELEMENT

FIELD OF THE INVENTION

The present invention relates to a wind turbine blade comprising an electro-thermal heating element.

BACKGROUND OF THE INVENTION

An electro-thermal heating element for a wind turbine blade is disclosed in WO 2019/001657. The heating element comprises an electrically conductive resistive material; two active busbars for supplying electrical power to the electrically conductive resistive material; and at least one dummy busbar at a predetermined spacing between the two active busbars on the electrically conductive resistive material.

SUMMARY OF THE INVENTION

A first aspect of the invention provides a wind turbine blade comprising an electro-thermal heating element, the electro-thermal heating element comprising: electrically resistive sheet material; a first electrode which is in electrical contact with the sheet material and positioned at a first end of the element; a second electrode which is in electrical contact with the sheet material and positioned at a second end of the sheet material; and an electrically conductive strip which extends across a width of the element, wherein the sheet material has a first part on a first side of the strip and a second part on a second side of the strip, the strip is in electrical contact with the first and second parts of the sheet material, the first part of the sheet material has a first width, and the second part of the sheet material has a second width which is different to the first width.

The second width may be greater than the first width or less than the first width.

The varying width of the sheet material enables the element to provide a tailored and variable heat flux to different parts of the blade. The electrically conductive strip creates a line of equipotential across the width of the mat which makes the heating effect more uniform.

The first and/or second part of the sheet material may have a width which varies (for instance continuously tapering), but more preferably the first part of the sheet material has a substantially constant width, and the second part of the sheet material has a substantially constant width. This provides a uniform heating effect within each part.

Preferably the sheet material has a width with a step change at the conductive strip. The electrically conductive strip avoids hot spots from developing at the step change.

In one embodiment the first part of the sheet material and the second part of the sheet material are formed from a single mat of the sheet material with a pair of surfaces, and the strip is carried by one of the surfaces of the mat. This is advantageous because it is easy to manufacture by cutting the mat to size and attaching the strip to one of its surfaces. In this case the strip is typically in electrical contact with the first and second parts of the sheet material via the one of the surfaces of the mat.

In other embodiments the first part of the sheet material and the second part of the sheet material are formed from individual panels of the sheet material. In this case the first and second parts may overlap, they may be joined edge-to-edge, or they may be separated by a gap.

The strip is in electrical contact with both parts of the sheet material, but it may not be in physical contact with both parts of the sheet material.

The strip is preferably in physical contact with one or both parts of the sheet material.

The strip is preferably in physical contact with at least the first part of the sheet material.

In one embodiment the strip has a first strip portion in physical contact with the first part of the sheet material, and a second strip portion in physical contact with the second part of the sheet material.

Preferably the second width is less than the first width, and the strip extends across a full width of the first part of the sheet material.

The heating element may have only a single electrically conductive strip at the junction where the first and second parts meet, or it may comprise a first electrically conductive strip carried by the first part of the sheet material and a second electrically conductive strip carried by the second part of the sheet material. The first and second strips may be joined by a conductive wire or conductive cross-bar.

The strip may have a flat substantially rectangular cross-section, or any other cross-sectional profile such as circular.

The blade may have a root and a tip, and the second part of the sheet material may be closer to the tip than the first part of the sheet material. This is advantageous because the element outputs a higher heat flux near the tip where it is needed.

The heating element may be positioned in a part of the blade where the blade tapers inwardly towards the tip. This is advantageous because the element may have a complementary tapering shape.

The electrically conductive strip may be parallel with a chord of the blade.

Optionally the blade has a leading edge, and the heating element has a leading edge which is parallel with the leading edge of the blade.

A system may be provided for driving the electro-thermal heating element by causing electrical currents to flow through the electrically resistive sheet material via the first and second electrodes.

Each part of the sheet material may be configured to generate a heat flux which is substantially uniform across its area.

The first part of the sheet material may be configured to generate a first heat flux, and the second part of the sheet material may be configured to generate a second heat flux which is greater than the first heat flux.

The first and second parts of the sheet material play have substantially the same sheet resistance.

The sheet material may comprise randomly oriented fibres (for example a veil).

The element may have only a single electrically conductive strip, but more typically it further comprises a second electrically conductive strip which extends across the width of the element, the second part of the sheet material is on a first side of the second strip, the sheet material has a third part on a second side of the second strip, the second strip is in electrical contact with the second and third parts of the sheet material, and the third part of the sheet material has a third width which is different to the second width. For example, the third width may be greater than the second width or less than the second width.

The third part of the sheet material may have a substantially constant width.

The electrically conductive strips may be parallel it each other.

The electrically conductive strips may be parallel with a chord of the blade.

The (or each) electrically conductive strip may be a copper strip, for example, or it may be made of any other suitable conductive material.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
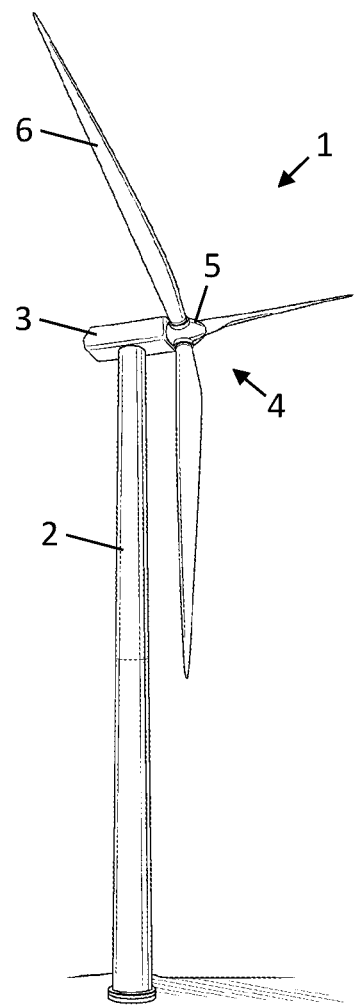
FIG. 1 shows a wind turbine.

FIG. 1 shows a wind turbine 1. The wind turbine 1 has a tower 2 and a nacelle 3 at the top of the tower 2. A wind turbine rotor 4 is connected to the nacelle 3 and arranged to rotate relative to the nacelle 3. The wind turbine rotor 4 comprises a wind turbine hub 5, and multiple wind turbines blades 6 extending from the hub 5. While a wind turbine rotor 4 having three blades 6 is shown, a different number of blades, such as two or four, may be used.

Figure 2:
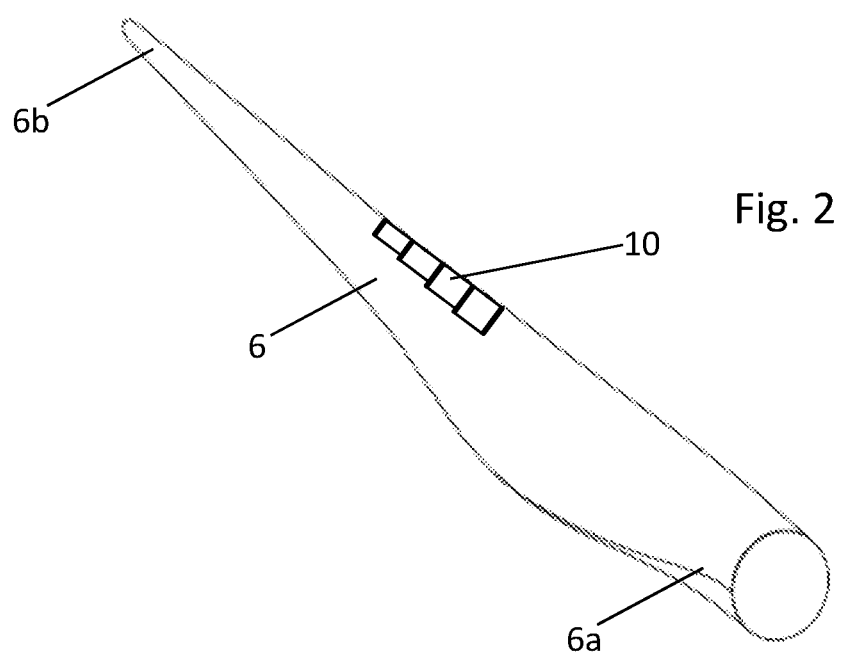
FIG. 2 shows a wind turbine blade with an electro-thermal heating element.

Each blade 6 has a row of electro-thermal heating elements embedded along its leading edge. The heating elements may be used for either or both of anti-icing (preventing ice accumulating) or de-icing (removing accumulated ice) of the blade 6. FIG. 2 shows a single one of such heating elements 10, the other heating elements being omitted from FIG. 2.

Figure 3:
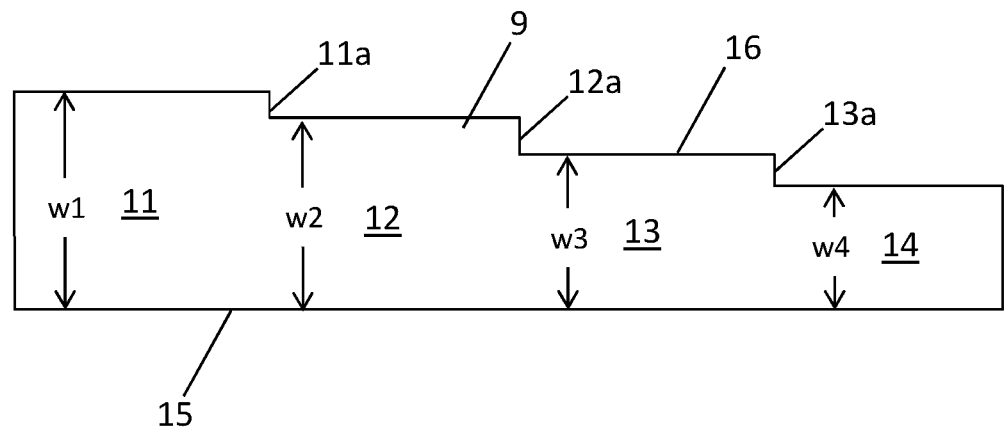
FIG. 3 shows a mat of electrically resistive material.

The heating element 10 comprises an electro-thermal heating mat 9 made of an electrically resistive sheet material such as randomly oriented fibres (for example a carbon fibre veil or a carbon/glass fibre veil) or a metallic mesh, The mat 9 is shown in FIG. 3 without any of the other components of the heating element 10.

The mat 9 is manufactured in a rectangular shape, then cut on one side to form a stepped shape which reduces in width from one end to the other. The mat 9 has four parts 11,12,13,14 with reducing widths w1, w2, w3, w4 respectively. The mat 9 has a leading edge 15 which runs along the leading edge of the blade as shown in FIG. 2, and a stepped trailing edge 16 which is cut with a step 11a, 12a, 13a between each adjacent part.

The leading edge 15 of the mat is shown as a straight line in the drawings for ease of illustration, but typically it is cut with a gentle curve to conform to the curved shape of the blade. Similarly, the trailing edge 16 of the mat is shown as a straight line between the steps 11a-13a for ease of illustration, but typically it is cut with a gentle curve which follows the curve of the leading edge 15. So, in this case the parts 11-14 are not strictly rectangular, although their widths w1-w4 between the curved edges of the mat are substantially constant.

Four parts 11-14 are shown in FIG. 3, but a smaller or larger number may be used in practice. For instance, there may be only two or three parts, or a much larger number of parts.

All of the parts may have different widths as shown in FIG. 3, or only some of them may have different widths.

Figure 5:
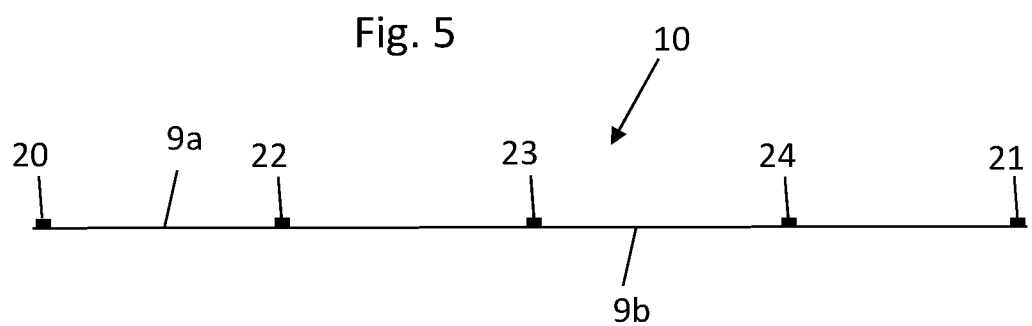
FIG. 5 shows the element from one edge.

As shown in FIG. 5, the four parts 11-14 of the mat 9 are formed from a single sheet of the electrically resistive sheet material with an upper surface 9a and a lower surface 9b.

Figure 4:
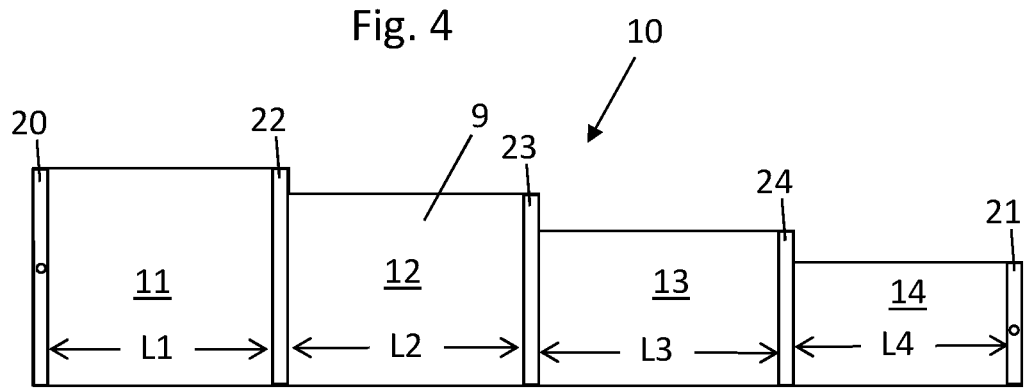
FIG. 4 shows an electro-thermal heating element incorporating the mat of FIG. 3.

As shown in FIG. 4, a first copper electrode 20 is attached to the upper surface 9a of the mat in electrical contact with the sheet material and positioned at a first end of the element 10. A second copper electrode 21 is attached to the upper surface 9a of the mat in electrical contact with the sheet material and positioned at a second end of the element 10.

In this example the electrodes 20, 21 are attached to the upper surface 9a of the mat, but in other examples the electrodes may be attached to the lower surface 9b or both surfaces 9a, 9b.

The electrodes 20, 21 in this example are made of copper, but other electrically conductive materials (typically metals) may be used.

Copper strips 22, 23, 24 extend across the width of the element at intermediate points along the length of the element. Each strip is carried by, and in electrical contact with, the upper surface 9a of the mat. Each strip is positioned at the junction between an adjacent pair of parts of the mat, at the step change in width. Thus, each strip has a first part of the mat on one side and a second part of the mat on the other.

For example, the mat has a first part 11 on a first side of the strip 22 and a second part 12 on a second side of the strip 22. The strip 22 is in electrical contact with the first and second parts 11, 12 of the sheet material via the upper surface 9a of the mat. The first part 11 of the sheet material has a first width w1, and the second part 12 of the sheet material has a second width w2 which is less than the first width w1. This repeats along the length of the element 10, with the width of the sheet material stepping down at each successive copper strip.

The strips 22-24 in this example are made of copper, but other electrically conductive materials (typically metals) may be used, As can be seen in FIG. 5, the electrodes 20, 21 and copper strips 22-24 have substantially rectangular cross-sections, although other cross-sectional shapes are possible.

The sheet material of the mat 9 has a sheet resistance chosen such that when a voltage is applied between the electrodes 20, 21, the mat 9 produces heat at a desired heat flux due to resistive or ohmic heating.

The electrodes and copper strips are spaced apart by lengths L1, L2, L3 and L4. These lengths may be the same, or different.

The heat flux H for each part of the mat is related to the width w by the equation:

$$H \propto \left(\frac{1}{w}\right)^2$$

So if, for example, the widths of the parts 11-14 change in the series 100%, 90%, 80%, 70%, then the heat fluxes change in the series 100%, 123%, 156%, 204%. So, in this case the heat flux at the narrow end of the element is over twice the heat flux at the wide end.

In another example, a four part stepped element of length 1.6 m and width reducing from 0.5 m to 0.35 m with a total resistance of 115 Ohms will deliver a heat flux varying from 1.45 KW/m$^2$ to 3 KW/m$^2$ if driven with a 400V source.

Another example is given in Table 1 below, which shows various parameters for a four part stepped element of length 2 m and width reducing from 0.5 m to 0.35 m with a total resistance of 80 Ohms, driven by a 577V source.

TABLE 1

|  |  | Part Number | | | | |
| --- | --- | --- | --- | --- | --- | --- |
|  |  | 1 | 2 | 3 | 4 | Total |
| Length | mm | 500 | 500 | 500 | 500 | 2000 |
| Width | mm | 500 | 450 | 400 | 350 |  |
| Area | m^2 | 0.25 | 0.23 | 0.20 | 0.18 | 0.85 |
| RS | ohms/sq | 20 | 20 | 20 | 20 |  |
| Resistance | ohms | 20.0 | 22.2 | 25.0 | 28.6 | 95.8 |
| Current | amp | 6.0 | 6.0 | 6.0 | 6.0 | 24.1 |
| Voltage | volts | 120 | 134 | 151 | 172 | 577 |
| Power | W | 726 | 806 | 907 | 1037 | 3475 |
| Heat Flux | kW/m^2 | 2.90 | 3.58 | 4.54 | 5.92 |  |

As shown in FIG. 2, the blade 6 has a root 6a and a tip 6b. The heating element 10 is positioned in an outboard part of the blade where the blade tapers inwardly towards the tip 6b. This outboard part of the blade tends to accrete more ice than the inboard part, and the aerodynamic power of the blade generally increases towards the tip 6b, So, positioning the narrow end of the heating element closer to the tip 6b than the wide end (as shown in FIG. 2) gives the desired result that the blade is heated more intensely towards the tip. The electrodes 20, 21 and copper strips 22-24 are parallel with each other and with a chord of the blade.

The inwardly tapering profile of the heating element 10 also gives the benefit of enabling it to be matched to the inwardly tapering profile of the blade 6 (desirably the width of the heating element is about 20% or 25% of the chord of the blade).

Figure 6:
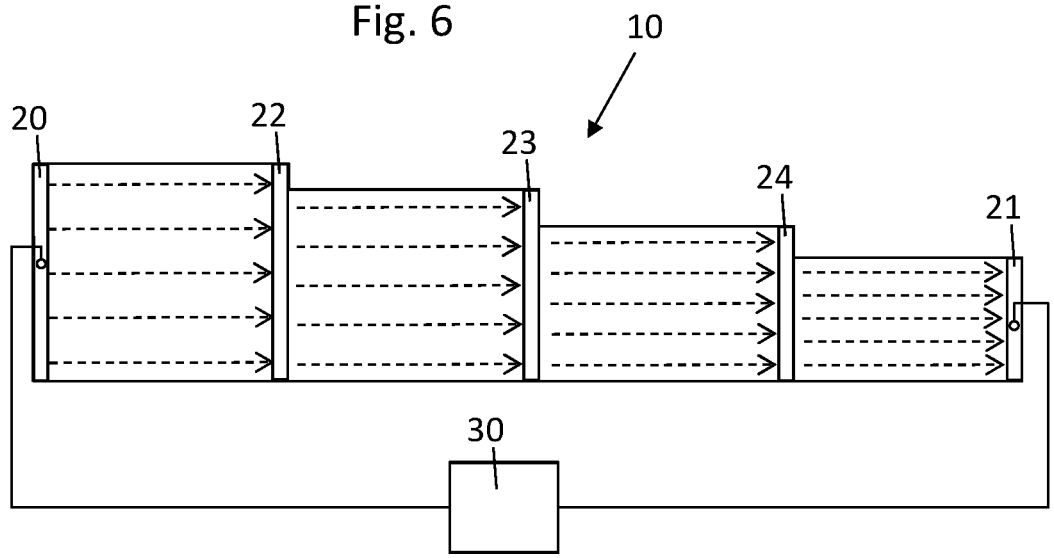
FIG. 6 shows a first drive system for the electro-thermal heating element.

FIG. 6 shows a first system for driving the electro-thermal heating element 10 by causing electrical currents to flow through the electrically resistive sheet material via the electrodes 20, 21. Each electrode 20, 21 has a respective connector 20a, 21b which is connected to a power source 30.

The power source 30 applies an AC or DC voltage V between the electrodes 20, 21. If the resistance between the electrodes is R, then the total power output by the heating element is $V^2/R$ or $I^2R$, where I is the current. The dashed arrows in FIG. 6 show the direction of current, which runs in straight lines and in one direction only. Because each part of the mat 9 has a substantially constant width and has an electrode or conductive strip at each end (with substantially zero resistance) the current density (and associated heat flux) within each part of the mat is uniform across the entire length and width of the part.

Figure 7:
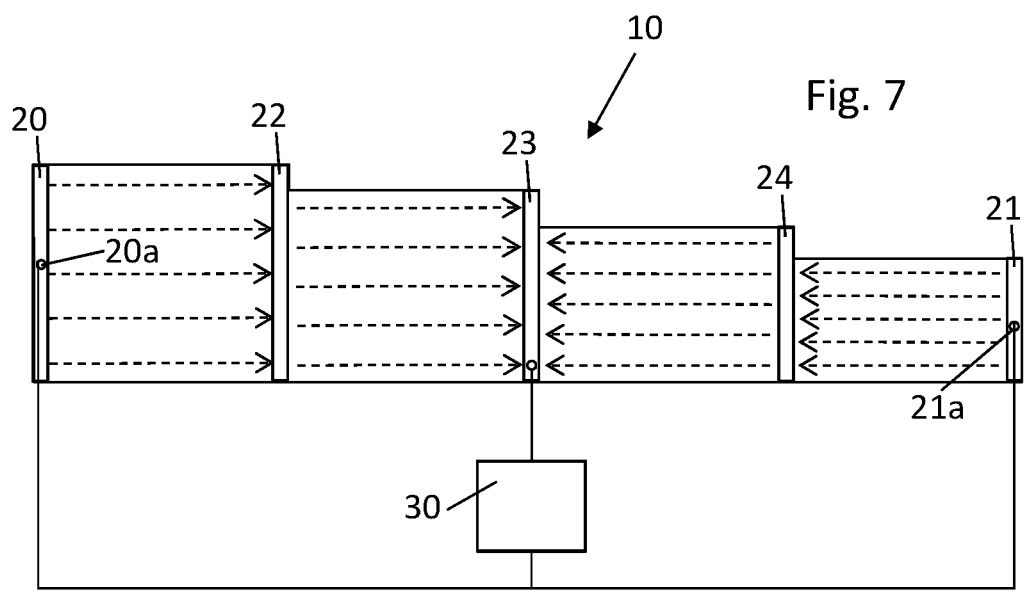
FIG. 7 shows a second drive system for the electro-thermal heating element.

FIG. 7 shows a second drive system. In this case the power source 30 drives the electrodes 20, 21 at the same voltage and the central copper strip 23 is used as a neutral electrode so the current flows towards or away from the neutral electrode.

Figure 8:
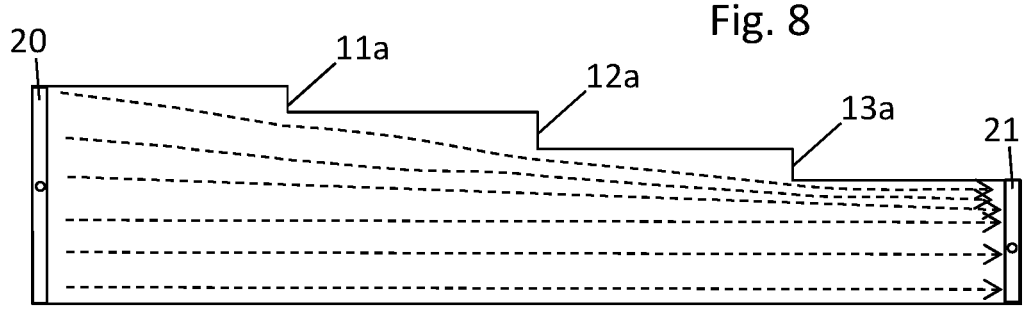
FIG. 8 shows how currents would flow across the electro-thermal heating element of FIG. 6 without the copper strips.

FIG. 8 shows the currents which would flow through the stepped mat of FIG. 3 without any of the copper strips 22-24. At each step change 11a-13a in width, the lines of current bunch together, creating an undesirable hot spot. There is also an intense hot spot at the trailing edge of the heating element next to the electrode 21 Such hot spots are reduced or removed entirely by the copper strips 22-24 which create lines of equipotential across the width of the mat.

The copper strips 22-24 can also be used as "dummy" busbars which enable repair to be achieved in a more effective manner, as described in WO2019/001657, the contents of which are incorporated herein by reference.

Figure 9:
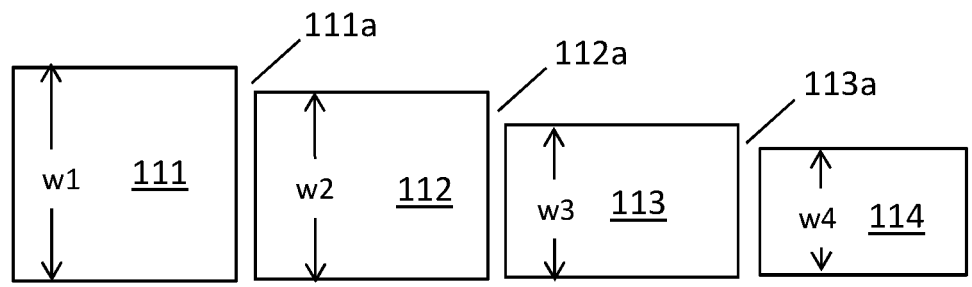
FIG. 9 shows three panels of electrically resistive sheet material.
Figure 10:
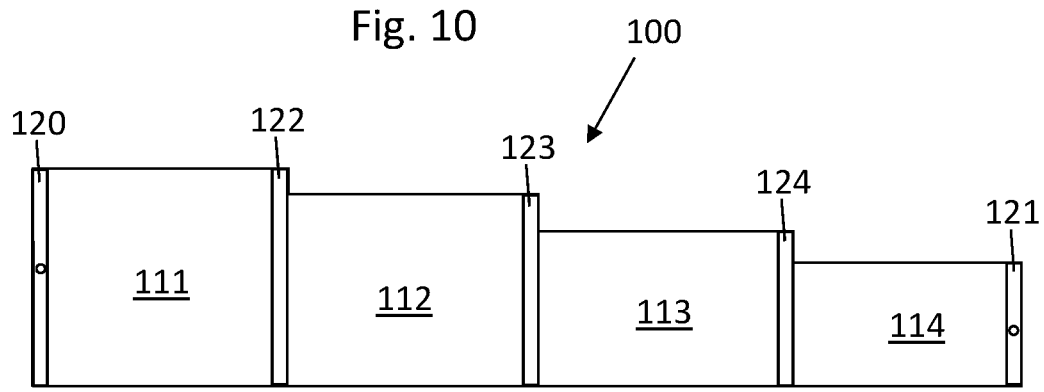
FIG. 10 shows an electro-thermal heating element incorporating the panels of FIG. 9.
Figure 11:
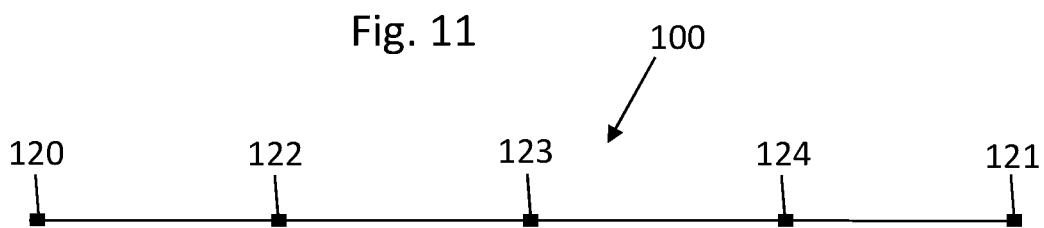
FIG. 11 shows the element of FIG. 10 from one edge.

In the embodiment of FIGS. 3-5 the element comprises a single mat 9 of resistive sheet material which is cut to shape, FIGS. 9-11 shows an alternative element 100 in which the four parts are made from separate rectangular panels 111-114 of electrically resistive sheet material which are joined together by copper strips 122-124 and have electrodes 120, 121 at either end. The panels 111-14 are separated by gaps which are filled by the copper strips 122-124.

Each panel 111-114 has a substantially constant width w1-w4 to achieve uniform heat flux within the panel. The width of the sheet material has a step change 112a, 112a, 113a at each copper strip.

Figure 12:
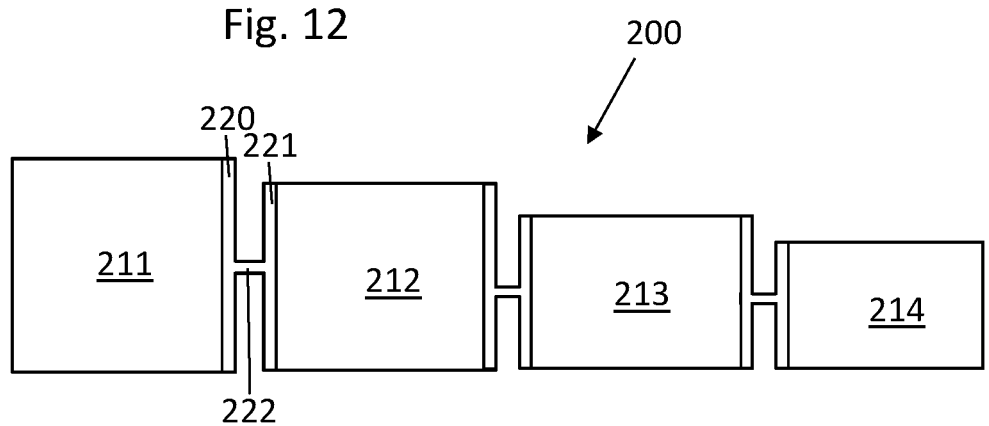
FIG. 12 shows an electro-thermal heating element with heating mat panels connected by H-shaped electrical connectors.
Figure 13:
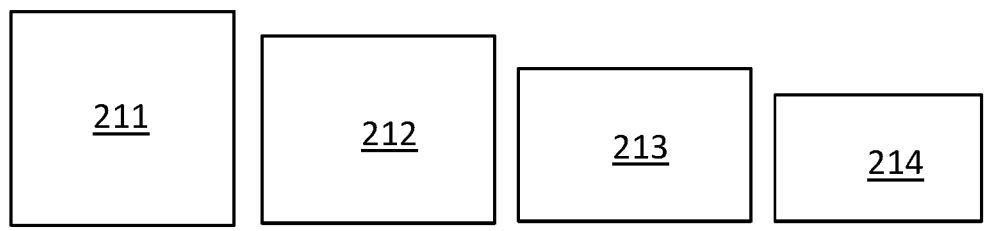
FIG. 13 shows four panels of electrically resistive sheet material which are used to construct the element of FIG. 12.

In the case of FIGS. 10 and 11, each strip 122-124 is rectangular in plan, and in physical contact with the edges of the panels on either side of the strip. FIG. 12 shows an alternative element 200 in which panels 211-214 (shown individually in FIG. 13) are electrically coupled by H-shaped connectors. Each connector comprises a pair of copper strips 220, 221 which extend across the width of the element, and a cross-bar 222 which may be a copper strip or wire for example. Each strip 220, 221 is carried by, and in electrical contact with, the upper surface of a respective one of the panels 211-214. The panels 211-14 are separated by gaps which are bridged by the conductive cross-bars 222.

In the embodiments above, each part of the heating mat has a substantially constant width w1-w4 to achieve uniform heat flux within the panel. However, this is not essential and in an alternative embodiment of the invention shown in FIG. 14, an element 300 is provided with a heating mat 309 which is cut so that each part 311-314 has a continuously tapering width with copper strips 322-324 arranged as shown.

Figure 14:
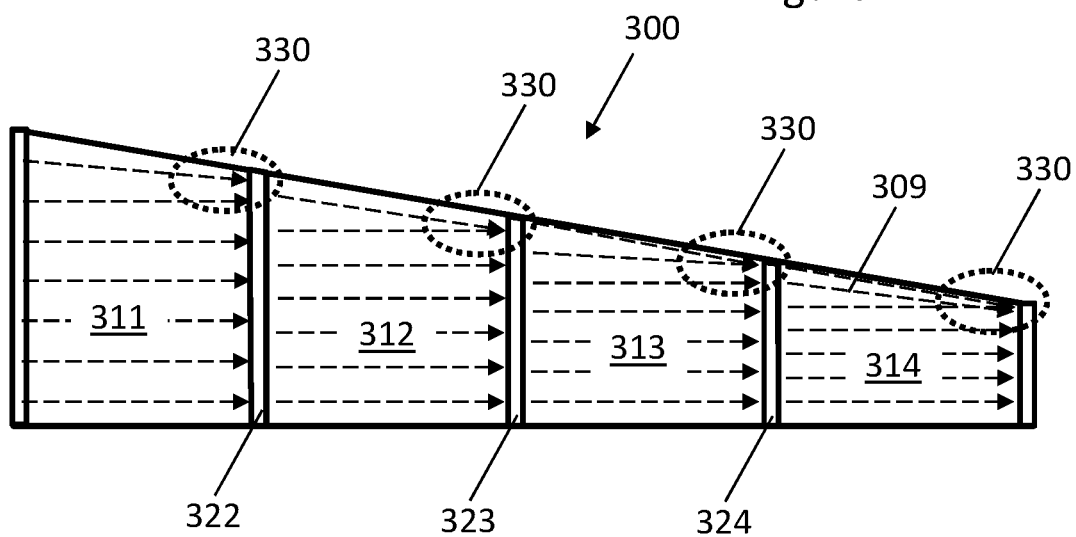
FIG. 14 shows a tapered electro-thermal heating element.
Figure 15:
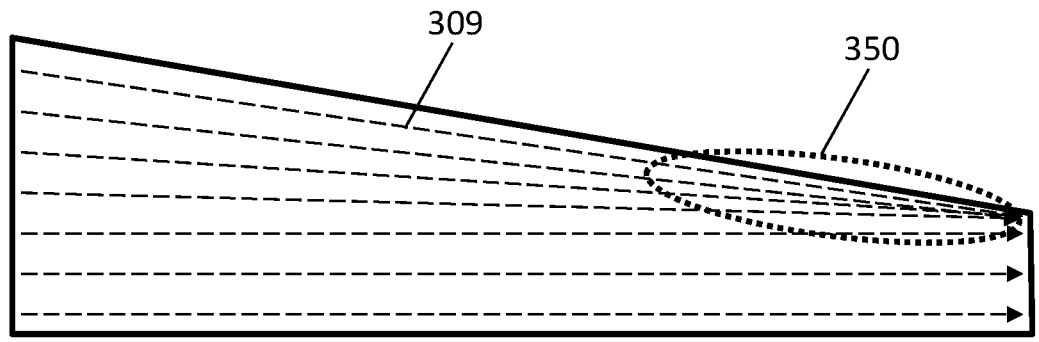
FIG. 15 shows lines of current in the tapered mat of the element of FIG. 14 in the absence of copper strips.

FIG. 15 shows the currents which would flow through the tapered mat 309 of FIG. 14 without any of the copper strips 322-324. The lines of current in the lower part of the mat 309 are parallel, but in the tapering upper part they converge to generate an intense hot spot 350. The element of FIG. 14 has hot spots 330 at the corner of each part 311-314, but these are less intense than the hot spot 250 in the case of FIG. 15.

The heat flux in the hot spot 250 can exceed design limits and result in damage to the area.

Figure 16:
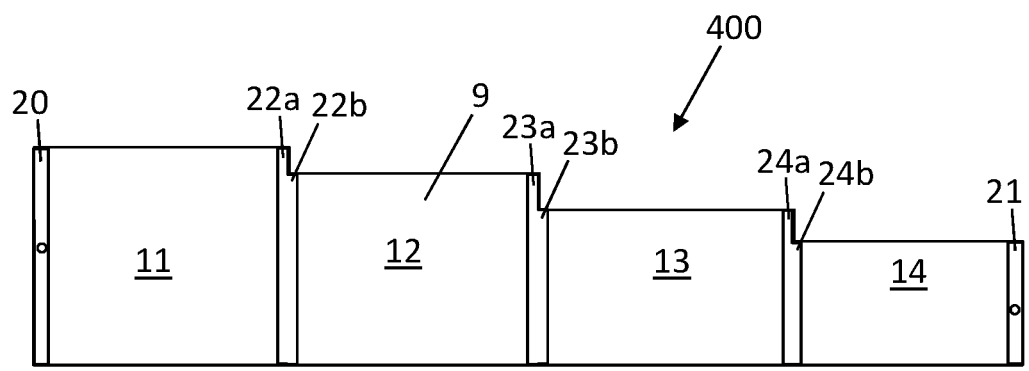
FIG. 16 shows a stepped electro-thermal heating element with stepped copper strips.

In the embodiment of FIG. 4 the copper strip 22 is carried by the first part 11 of the sheet material so that it is in physical contact with the first part 11, but not in physical contact with the second part 12 of the sheet material (although it is in electrical contact with the second part 12). In the alternative embodiment of FIG. 16 each copper strip has a stepped shape and spans across the junction so that it is in physical contact with both parts of the mat on either side of the strip. Each strip has a wide strip portion 22a, 23a, 24a carried by the wider part of the mat, and a narrow strip portion 22b, 23b, 24b carried by the narrower part of the mat.

Figure 17:
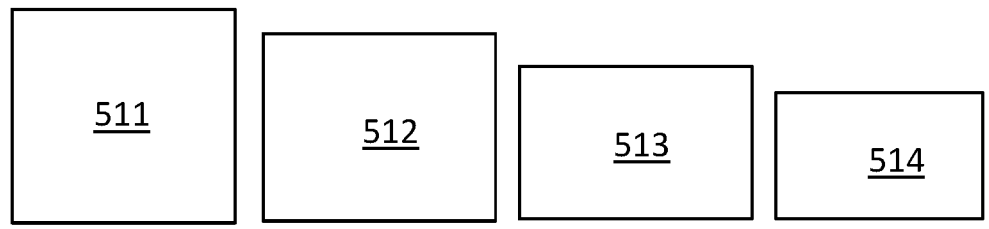
FIG. 17 shows four panels of electrically resistive sheet material which are used to construct the element of FIG. 16.
Figure 18:
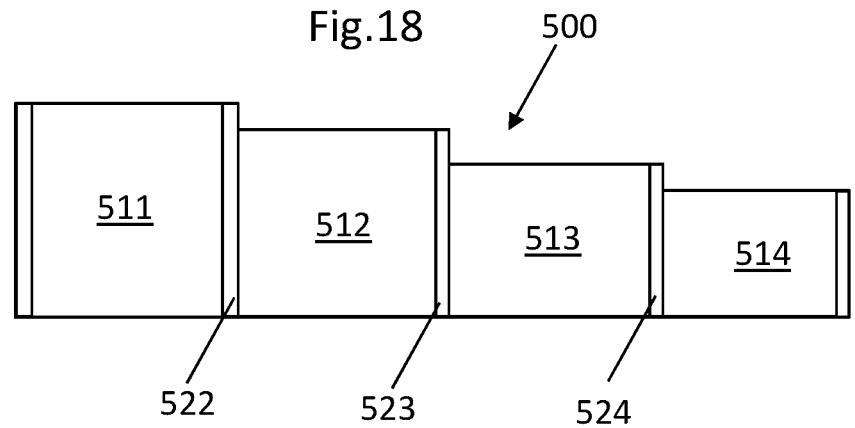
FIG. 18 shows an electro-thermal heating element with overlapping panels.

In the embodiment of FIGS. 10 and 12, the separate panels do not overlap. In an alternative embodiment shown in FIGS. 17 and 18, heating mat panels 511-514 are cut to shape as shown in FIG. 17 then overlapped as shown in FIG. 18. Copper strips 522-524 are attached to the upper faces of the widest panels 511-513 to form the completed element 500.

Figure 19:
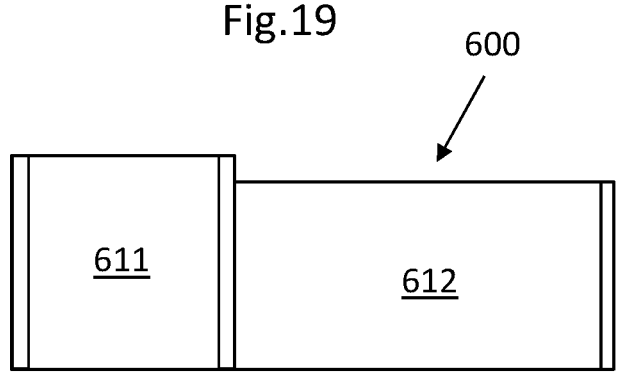
FIG. 19 shows an electro-thermal heating element with parts of different lengths.

FIG. 19 shows a heating element 600 with first and second parts 611, 612 which have different lengths as well as different widths.

Figure 20:
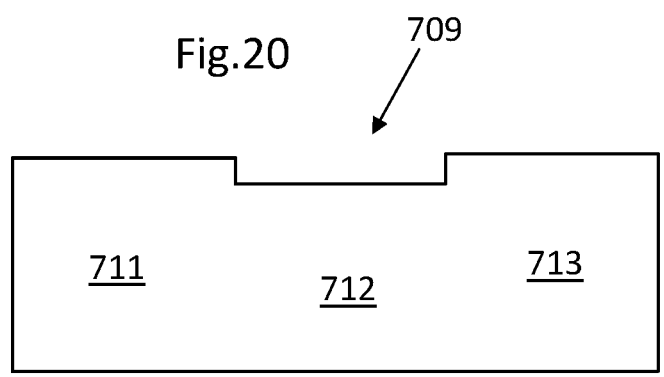
FIG. 20 shows a mat of electrically resistive material with a width which steps down and then up.
Figure 21:
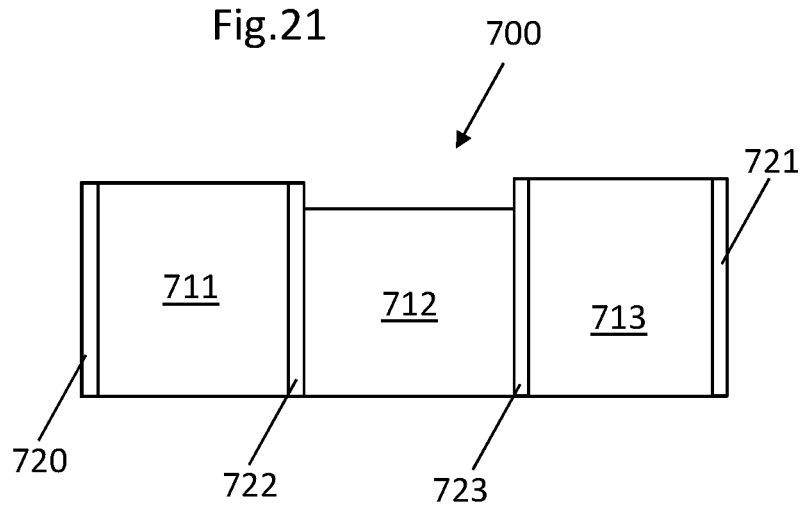
FIG. 21 shows an electro-thermal heating element incorporating the mat of FIG. 20.

FIG. 20 shows a heating mat 709 which is cut to form parts 711, 712, 713 with different widths. The width reduces at the first step between the parts 711, 712, then increases at the second step between the parts 712, 713. Copper strips 722, 723 and electrodes 720, 721 are then added as shown in FIG. 21 to form the heating element 700.

Although the invention has been described above with reference to one or more preferred embodiments, it will be appreciated that various changes or modifications may be made without departing from the scope of the invention as defined in the appended claims.

The invention claimed is:

1. A wind turbine blade comprising an electro-thermal heating element, the electro-thermal heating element comprising:
   electrically resistive sheet material;
   a first electrode which is in electrical contact with the sheet material and positioned at a first end of the resistive sheet material;
   a second electrode which is in electrical contact with the sheet material and positioned at a second end of the sheet material; and
   an electrically conductive strip which extends across a width of the element, wherein the sheet material has a first part on a first side of the strip and a second part on a second side of the strip,
   the strip is in electrical contact with the first and second parts of the sheet material,
   the first part of the sheet material has a first width, and the second part of the sheet material has a second width which is different to the first width, and
   wherein the first electrode, the second electrode, and the strip extend parallel to one another and a chord of the wind turbine blade.

2. A wind turbine blade according to claim 1 wherein the first part of the sheet material has a substantially constant width, and the second part of the sheet material has a substantially constant width.

3. A wind turbine blade according to claim 1 wherein the sheet material has a width with a step change at the conductive strip.

4. A wind turbine blade according to claim 1 wherein the first part of the sheet material and the second part of the sheet material are formed from a single mat of the sheet material with a pair of surfaces, and the strip is carried by one of the surfaces of the mat.

5. A wind turbine blade according to claim 1 wherein the blade has a root and a tip, and the second part of the sheet material is closer to the tip than the first part of the sheet material.

6. A wind turbine blade according to claim 5 wherein the heating element is positioned in a part of the blade where the blade tapers inwardly towards the tip.

7. A wind turbine blade according to claim 1 further comprising a system for driving the electro-thermal heating element by causing electrical currents to flow through the electrically resistive sheet material via the first and second electrodes.

8. A wind turbine blade according to claim 1 wherein the first part of the sheet material is configured to generate a first heat flux, and the second part of the sheet material is configured to generate a second heat flux which is greater than the first heat flux.

9. A wind turbine blade according to claim 1 wherein the strip and the first electrode, the second electrode, or a second electrically conducting strip are positioned on opposing sides of the first part, and wherein the sheet material, the strip, and the first electrode, the second electrode, or the second electrically conducting strip are arranged so that current flows in straight lines and in one direction across the first part.

10. A wind turbine blade according to claim 1 wherein the sheet material comprises randomly oriented fibres.

11. A wind turbine blade according to claim 1 wherein the strip is in physical contact with at least the first part of the sheet material.

12. A wind turbine blade according to claim 1 wherein the first width of the first part and the second width of the second part extend along a chordwise direction of the wind turbine blade, and wherein the strip extends across a full width of the first part of the sheet material along the chordwise direction.

13. A wind turbine blade according to claim 1 wherein the electro-thermal heating element further comprises a second electrically conductive strip which extends across the width of the element,
   the second part of the sheet material is on a first side of the second strip,
   the sheet material has a third part on a second side of the second strip,
   the second strip is in electrical contact with the second and third parts of the sheet material, and
   the third part of the sheet material has a third width which is different to the second width.

14. A wind turbine blade according to claim 1 wherein the first part of the sheet material and the strip are arranged to allow a uniform current density across the first width and a length of the first part, the first width extends along a chordwise direction of the wind turbine blade and the length extends along a spanwise direction of the wind turbine blade.

15. A wind turbine blade according to claim 1 wherein each part of the sheet material is configured to generate a heat flux which is substantially uniform across its area.

16. A wind turbine, comprising:
   a tower;
   a nacelle disposed on the tower;
   a generator disposed in the nacelle;
   a rotor coupled to the generator and having a hub at a distal end;

a plurality of blades disposed on the hub of the rotor; wherein at least one blade of the plurality of blades comprises an electro-thermal heating element, the electro-thermal heating element comprising:

electrically resistive sheet material;

a first electrode which is in electrical contact with the sheet material and positioned at a first end of the element;

a second electrode which is in electrical contact with the sheet material and positioned at a second end of the sheet material; and an electrically conductive strip which extends across a width of the element; wherein:

the sheet material has a first part on a first side of the strip and a second part on a second side of the strip, the strip is in electrical contact with the first and second parts of the sheet material, the first part of the sheet material has a first width, and the second part of the sheet material has a second width which is different to the first width, and wherein the first electrode, the second electrode, and the strip extend parallel to one another and a chord of the at least one blade.

17. A wind turbine according to claim 16 wherein the first part of the sheet material has a substantially constant width, and the second part of the sheet material has a substantially constant width.

18. A wind turbine according to claim 16 wherein the sheet material has a width with a step change at the conductive strip.

19. A wind turbine according to claim 16 wherein the first part of the sheet material and the second part of the sheet material are formed from a single mat of the sheet material with a pair of surfaces, and the strip is carried by one of the surfaces of the mat.

20. An electro-thermal heating element, comprising:

an electrically resistive sheet material;

a first electrode in electrical contact with the sheet material and positioned at a first end of the resistive sheet material;

a second electrode which is in electrical contact with the sheet material and positioned at a second end of the sheet material; and an electrically conductive strip which extends across a width of the element, wherein the sheet material has a first part on a first side of the strip and a second part on a second side of the strip, the strip is in electrical contact with the first and second parts of the sheet material, the first part of the sheet material has a first width, and the second part of the sheet material has a second width which is different to the first width, and wherein the first electrode, the second electrode, and the strip extend parallel to one another and a chord of a wind turbine blade.

* * * * *